No. 786,867. PATENTED APR. 11, 1905.
F. E. WILCOX & L. E. HICKOK.
VEHICLE GEAR.
APPLICATION FILED OCT. 29, 1904.

WITNESSES:
Chas. K. Davis.
John A. Daly

INVENTORS
F. E. Wilcox,
L. E. Hickok,
BY F. E. Stebbins.
Attorney

No. 786,867. Patented April 11, 1905.

UNITED STATES PATENT OFFICE.

FRANK E. WILCOX AND LESTER E. HICKOK, OF MECHANICSBURG, PENNSYLVANIA.

VEHICLE-GEAR.

SPECIFICATION forming part of Letters Patent No. 786,867, dated April 11, 1905.

Application filed October 29, 1904. Serial No. 230,533.

*To all whom it may concern:*

Be it known that we, FRANK E. WILCOX and LESTER E. HICKOK, citizens of the United States, residing at Mechanicsburg, in the county of Cumberland and State of Pennsylvania, have invented new and useful Improvements in Vehicle-Gears, of which the following is a specification.

Our invention relates to vehicle-gears, and specifically to the well-known Brewster type, our object being to improve the gear so that it may be manufactured with greater facility, the original cost be somewhat reduced, repairs be made less difficult when necessary, and, finally, to provide for adjusting the frictional surfaces when they become worn.

With the above main ends in view our invention consists in certain novelties of construction and combinations of parts hereinafter set forth and claimed.

The accompanying drawings illustrate an example of the physical embodiment of our invention constructed according to the best mode we have so far devised for the practical application of the principle.

Figure 1:
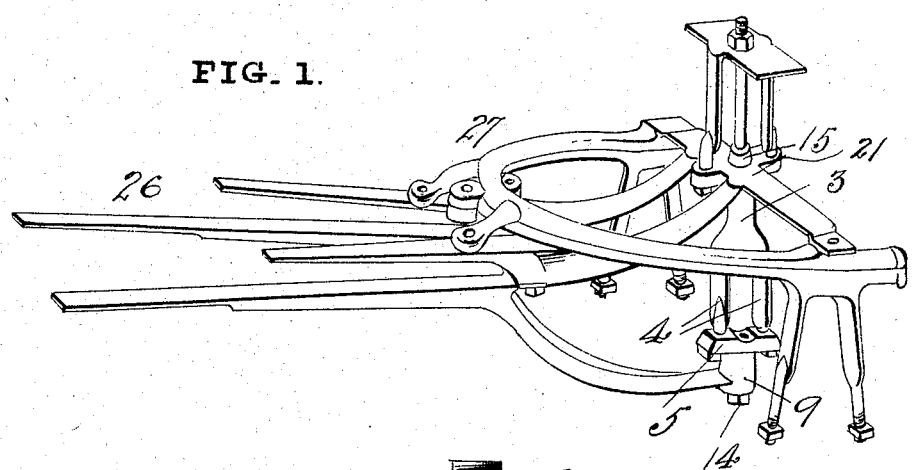
Figure 2:
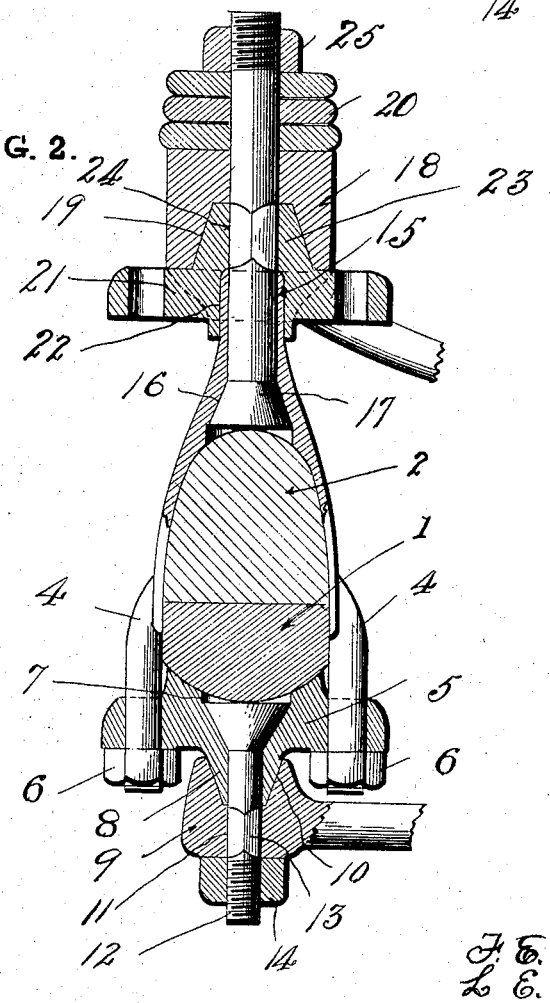

Figure 1 is a view in perspective of the gear as a whole. Fig. 2 is a perpendicular section of Fig. 1, taken on a line through the king-bolt and brace-head, the leaves of a spring and the head-block being added and shown in section.

Referring to the figures, the numeral 1 designates the axle; 2, the axle-cap; 3, the combined king bolt and clip; 4, the prongs or legs of the clip; 5, the axle-yoke having perforated lugs to receive the prongs of the clip; 6, nuts which secure the prongs to the clip; 7, a hole through the yoke having the upper end thereof enlarged and with a beveled surface; 8, a tapered perforated projection at the under surface of the yoke; 9, the perforated brace-head; 10, a tapered recess at the upper end of the perforation through the head to receive the projection under the yoke; 11, the lower portion of the hole through the brace-head made square or angular in cross-section; 12, a bolt with a tapered head seated in the yoke and passed through the brace-head; 13, the square or angular portion of the bolt which fits the angular hole in the brace-head; 14, a nut upon the bolt; 15, the king-bolt proper made integral with the clip and with a hole therethrough; 16, the tapered lower portion of the hole; 17, a bolt with a tapered head and with a portion of its shank made square or angular in cross-section; 18, the head-block; 19, a hole with the lower portion thereof enlarged and tapered; 20, the lower leaves of an elliptic spring; 21, the head-block plate; 22, a hole through the head-block plate, the lower portion being enlarged to receive the top end of the king-bolt proper; 23, a boss upon the upper surface of the head-block plate, which fits within the recess in the under surface of the head-block; 24, the square or angular hole through the boss and which fits the angular portion of the headed bolt; 25, a nut upon the end of the bolt 17, which latter passes through the head-block and leaves of the spring; 26, the reach-irons, and 27 the upper and lower members of the fifth-wheel.

It will be observed that the bolt 12 unites the axle-yoke and brace-head and that the bolt cannot revolve, so that the wear is upon the bolt-head and shank and the frictional surfaces of the projection upon the yoke and the tapered hole in the brace-head. It is obvious that the turning of the nut upon the bolt will take up the wear upon the parts. Further, the bolt 17 cannot revolve, so that the wear is upon its head and shank, the interior surface of the hole through the king-bolt proper, and the contact-surfaces of the exterior portion of the king-bolt end and the recess in the head-block plate. The turning of the nut 25 will bring the bearing-surfaces into contact when worn. In cramping the vehicle the only movable parts, consequently, are the axle and bed, the clip and king-bolt, the axle-yoke, and the lower member of the fifth-wheel circle.

From the foregoing description it becomes clear that we have produced an improved gear which fulfils all the conditions set forth as the purpose of our invention and which possesses other advantageous characteristics which will be recognized by those skilled in the art.

Modifications of the constructions shown may of course be introduced in practice which will not constitute substantial departures.

What we claim as new, and desire to secure by Letters Patent, is—

1. The combination in a vehicle-gear, of a combined hollow king-bolt and clip 15; a head-block plate engaging the king-bolt; a bolt 17 with a conical head uniting the king-bolt and head-block plate and anchored relative to the head-block plate; an axle-yoke with a perforation, a projection, and a conical seat; a perforated brace-head with a recess; and a bolt 12 with a conical head only, uniting the brace-head and axle-yoke and anchored relative to the brace-head; whereby the bolts 12 and 17 are fixed and the combined king-bolt and clip, the axle, and the axle-yoke may have rotary movement and the wear of the parts be taken up by turning the nuts upon the bolts.

2. The combination in a vehicle-gear, of an integral combined king-bolt and clip; a head-block plate engaging the king-bolt 15; a bolt 17 with a tapered head uniting the head-block, head-block plate and the combined king-bolt and clip; an axle-yoke having a hole 7 with a beveled cone-shaped seat; a perforated brace-head and a part of said perforation being angular in shape; and a bolt having a head with a beveled surface only to fit the cone-shaped seat, and with a shank angular in cross-section to fit the angular hole in the brace-head; said bolt uniting the axle-yoke and brace-head.

3. The combination in a vehicle-gear, of a perforated axle-yoke with a conical seat and with a perforated projection at its under surface; a perforated brace-head with a recess to receive the projection; and a bolt uniting the yoke and brace-head; said bolt having a tapered head to fit the conical seat, and anchored relative to the brace-head so the bolt cannot turn.

4. The combination in a vehicle-gear of a combined king-bolt and clip; a head-block plate engaging the king-bolt 15; a bolt 17 with a tapered head; an axle-yoke with a conical seat and projection; a brace-head with a recess and a hole; and a bolt uniting the axle-yoke and brace-head; said bolt having a tapered head which fits the conical seat in the axle-yoke.

5. The combination in a vehicle-gear, of a perforated axle-yoke with a perforated tapering projection at its under surface; a perforated brace-head with an angular hole 11 and a recess 10 having a beveled surface to fit the tapering projection; and a bolt uniting the yoke and brace-head and having an angular portion 13 matching the angular hole 11 in the brace-head.

6. The combination in a vehicle-gear, of an axle-yoke having a perforation with a conical seat for a bolt-head; a perforated brace-head; a bolt with a tapered head throughout fitting the conical seat; and means for anchoring the bolt relative to the brace-head.

In testimony whereof we affix our signatures in presence of two witnesses.

FRANK E. WILCOX.
LESTER E. HICKOK.

Witnesses:
H. C. BROWN,
H. H. MERCER.